United States Patent [19]
Fehmerling

[11] 3,729,324
[45] Apr. 24, 1973

[54] SEPARATION OF EDIBLE TISSUE FROM EDIBLE FLESH OF MARINE CREATURES

[75] Inventor: Gottlieb Bernhard Fehmerling, Bridgeton, N.J.

[73] Assignee: Ocean Research Corporation, Hopewell, N.J.

[22] Filed: Oct. 16, 1970

[21] Appl. No.: 80,459

Related U.S. Application Data

[63] Continuation-in-part of Ser. No. 843,850, July 22, 1969, abandoned.

[52] U.S. Cl...................................99/111, 195/2
[51] Int. Cl..............................A22c 29/00
[58] Field of Search ......................99/111; 195/2

[56] References Cited

UNITED STATES PATENTS

| | | | |
|---|---|---|---|
| 2,825,654 | 2/1958 | Jaupel | 99/107 |
| 3,098,014 | 7/1963 | Denton et al. | 99/107 |

*Primary Examiner*—A. Louis Monacell
*Assistant Examiner*—Robert M. Elliott
*Attorney*—Mason, Fenwick & Lawrence

[57] ABSTRACT

A method for separation of undesirable edible tissue such as the reproductive, digestive, or other tissue, including skin, from a marine creature such as shellfish, abalones, conches, mussels, scallops, oysters, and clams, or fish such as catfish, tuna, trout, haddock, cod, and flat fish, by immersing the marine creature after any hard shell it may have had is removed in a 0.003–3 percent aqueous solution of enzymes containing 1 to 75 percent proteolytic, 1 to 75 percent glycoside hydrolases, and 1 to 75 percent lipolytic enzymes. Optionally, 1–50 percent pentosanase as well as pectolytic and cellulolytic enzymes may be added. The marine creatures may be divided, washed and preheated prior to immersion in the bath.

24 Claims, No Drawings

SEPARATION OF EDIBLE TISSUE FROM EDIBLE FLESH OF MARINE CREATURES

This application is a continuation-in-part of my copending application Ser. No. 843,850, filed July 22, 1969 now abandoned.

Generally, the present invention relates to a process for treating marine creatures to separate various edible portions. More specifically, the present invention is concerned with a method for separating undesirable though edible tissue that may have nonacceptable color, texture, or other characteristic from desirable edible flesh of a marine creature.

In present-day practices, edible parts of marine creatures may be obtained from their shell enclosures by a variety of methods of means. Among the common commercial methods and apparatus are mechanical, electrical, and heat treatments which include, for instance, subjecting the marine creature to a sawing action on the shells, a high or low electrical voltage through the shells, or treatment with a direct flame, as well as immersion in boiling water or various chemical treatments, as well as treatment with steam at atmospheric pressure or under high pressure in closed vessels. Combinations of these processes also are commonly used. One of the newest and most successful processes for shucking clams, for instance, includes subjecting the shell to extremely high temperature for a very short time to effect a release of the edible clam from the shell.

While some of the processes and techniques may experience varying degrees of success, most of the prior known processes required at least some hand labor to treat the individual marine creature in order to remove the edible flesh and even may require further treatment to produce desirable edible flesh as the final product.

Any of these prior art processes, including manual procedures, may adversely affect the flavor, odor, or appearance of the fleshy portion in varying degrees, while certain other processes result in sand or other earthy substances, found attached to the marine creature due to the methods used in harvesting shellfish, becoming embedded into the edible flesh. Normally, this foreign matter cannot be entirely removed from the flesh, and therefore results in low quality products having substantially reduced consumer appeal.

In my prior application entitled "Process and Composition for Loosening and Removing Edible Tissue from Shells of Marine Creatures," Ser. No. 636,249, filed May 5, 1967, now U.S. Pat. No. 3,513,071, there was proposed a new approach to loosening and removing the edible tissue from the shells of the marine creatures. Briefly, in this prior application, the method involves the immersion of the creatures in an aqueous bath of enzymes comprising a synergistic mixture of proteolytic and diastatic enzymes for a sufficient time to dissolve at least partially the connective tissue between the shell and the edible portion permitting the edible portion to be preferably subsequently easily flushed out or otherwise separated from the shell.

While this method has been found to be eminently successful in most all instances, it nevertheless has been found that the edible portion removed from the shell, in the case of those marine creatures having shells, includes not only the desirable palatable flesh, but also an undesirable though edible portion. The undesirable edible portion is unacceptable generally due to its color, texture, or other characteristics that do not render it palatable. The undesirable edible tissue may, for instance, be the digestive or reproductive organs of the marine creature or any covering or protecting membrane or tissue surrounding any portion of the marine creature such as the skin in the case of fish.

To separate the various edible portions of any marine creature, however previously removed from its shell for those creatures having a shell, or from the skin, is a somewhat laborious task particularly if it is performed manually. Additionally, in prior art methods of forcing a separation of the undesirable edible portion, there is generally a loss of the desirable edible flesh which decreases the efficiency of the process by reducing the quantity of the final product. This problem is particularly prevalent with clams and scallops, though any marine creature having an outer shell, hard or tough skin may face a similar problem that has not been fully solved with prior art methods.

For instance, conventionally shucked clams at present must have the belly, located on the large end of the tongue of the clam, removed by manual squeezing. Workers tear the tongue from the remainder of the clam flesh and, with a squeezing-milking action, tear off that portion of the tongue in which the belly is embedded, removing a considerable portion of usable, desirable edible flesh along with the undesirable, though edible, belly in the process. During the squeezing operation, sand and other earthy substances which may be entrapped in the belly may be forced deeply into the tissues of the tongue. This foreign material requires extreme washing treatment to remove even after clams are ground, minced, diced or sliced. The extreme rigor of the washing together with the large volume of water used tends to remove valuable soluble solids from the clam tissues, thus lowering the nutritive value and reducing recovery of usable flesh.

A further concept to which the present invention has been directed is the long-standing problem of skinning of fish such as, particularly tuna fish, catfish, etc., but also any of the flat fish such as halibut, flounder, turbot, sole, and the like, or any of the other edible fish that are traditionally skinned before being sold to the commercial market. In the past, commercial fish canners of tuna, particularly albacore tuna, found that the processing of such albacore tuna provided perhaps the most difficult task inasmuch as the skin of the albacore tuna is tightly and securely held to the flesh. The usual prior art process involved the heating of the tuna with steam for several hours, and then the skin was attempted to be removed either by mechanical means, manually, or usually by water spray. It was found, however, that if any of the skin were removable from the tuna by water spray, it would be less than 25 percent of the skin; and usually only 15 percent of the area of skin could be so removed leaving the remainder to be removed by manual scraping. When each fish must be so treated, it is obvious that the cost of such operation becomes prohibitive, not only in the additional time required, but also when scraping or other harsh methods are used, desirable flesh is lost with the skin when finally removed.

It is accordingly the principal object of the present invention to provide a process for the separation of desirable edible flesh from the undesirable though edible tissue.

A further object of the present invention is to provide a method for the removal of the digestive and reproductive organs, or any covering or protective membrane such as skin or tissue from the desirable edible flesh.

It is a particular object of the present invention to provide a method for the removal of the digestive or reproductive organs from clams, scallops, mussels, conches, abalones, or other shellfish that have been previously removed from the shell.

It is another specific object of the present invention to provide a method to facilitate the removal of the skin of various fish such as tuna or flat fish or other commercially processed fish.

A further and still more specific object of the present invention is to provide a combination of enzymes forming an enzyme system capable of separating various undesirable edible tissues from desirable edible flesh.

A still further object of the present invention is the incorporation of additional optional enzymes to attack and degrade particular connective tissue between desirable and undesirable edible tissue.

Another object of the present invention is the preservation of the life and effectiveness of the enzyme bath by maintaining a relatively constant temperature.

A further object of the present invention is the removal from divided clams of a substantial amount of the naturally occurring enzymes to maintain a preselected enzyme bath concentration and improve the yield, color, taste and texture of the final product.

These and other objects of the present invention will become apparent upon careful study of the following specification.

Throughout the specification and claims, the terms "undesirable edible tissue" and "desirable edible flesh" will be used and should be understood to mean as follows:

Undesirable edible tissue is that portion of a marine creature without a hard exterior or a hard covering or portion which, by reason of its color, toughness, texture, or other undesirable characteristics, makes it unacceptable or unpalatable. Examples of such undesirable though edible tissue are: (a) the skin of a fish such as trout, tuna, catfish, or flat fish or other fish generally considered edible, (b) the digestive organs of the marine creature, (c) reproductive organs of the marine creature, (d) any covering or protective membrane or tissue surrounding any portion of the marine creature, and may include as the undesirable edible tissue, for instance, the belly of the clam.

The desirable edible flesh is that portion of the marine creature which is traditionally eaten and has a texture, color, and flavor that is appealing to the public.

The present invention is the discovery that a combination of enzymes forming an aqueous bath will, on immersion of the marine creature, separate the undesirable edible tissue from the desirable edible flesh. The enzymes that must be used in combination are the proteolytic, glycoside hydrolase and lipolytic enzymes. Optionally, pentosanase, pectolytic and cellulolytic enzymes may be added. All of these enzymes may be obtained from any recognized source such as plant, animal or microorganism sources and may include the marine creatures as such a source. Enzymes of the particular class found to be necessary for this invention have been previously identified and are readily available to the art. All the following classes and subclasses of enzymes as well as further specific examples of each may be found disclosed on pages 672–785 of "Enzymes," M. Dixon and E. C. Webb, 2nd Edit. (1964), Academic Press, New York City, hereinafter referred to as "Enzymes."

Examples of those proteolytic enzymes useful for the purposes of this invention are papain, ficin, bromelin, which find their source in plants. Other Proteolytic enzymes which are obtainable from animals include the enzymes tripsin, chymotrylsin and pancreatin. Other enzymes obtainable from molds include *Aspergillus wentii* and *Aspergillus oryzae*. Bacterially derived enzymes obtained from culturing bacteria organisms such as *Bacillus mesenteroides*, *Bacterium subtillis*, and *Clostridium welchii*. Specific examples of the above may include ATP:protein phospho transferose and ATP:L-homoserine O-phospho transferose. Other specific examples of proteolytic enzymes are disclosed in "Enzymes," all of which are suitable. The amount of the proteolytic enzymes to be used in the aqueous bath ranges from 1 to 75 percent, and preferably 5 to 15 percent of the total weight of the enzymes in the bath.

The glycoside hydrolase enzymes useful in accordance with the present invention are for example only hexoseoxidases and amylases, both alpha and beta amylase, as well as amyloglucoside. Other specific examples of such an enzyme are fructose-1, 6-diphosphate, d-glycerolaldehyde-3-phosphate-lycose and alpha-1, 4-glucan 4-glucano-hydrolase. Other glycoside hydrolase enzymes are disclosed on pages 740–747 of "Enzymes," all of which are suitable. The glycoside hydrolase enzymes should be present in the bath in an amount between 1 to 75 percent total weight of enzymes; preferably the amount of the glycoside hydrolase enzymes should be varied between 5 to 25 percent. These enzymes cause the breakdown of 6 carbon, or multiples thereof, carbohydrates such as starch, hemicellulose, etc.

The lipolytic enzymes are those esterases capable of hydrolyzing fat and particularly include lipase/esterase. Any lipolytic enzyme may be used as is disclosed in "Enzymes" and may include for example glycerol ester hydrolyase, lysolecithin acylhydrolyase, etc. The amount of the lipolytic enzymes used in the aqueous bath may vary from 1 to 75 percent and, preferably, should be between 5 and 50 percent by weight of the enzymes.

The foregoing combination of enzymes provides a synergistic combination which effectively attacks and degrades the various connective tissue between the undesirable and desirable edible portions.

As a further facet of the present invention, it has been discovered that the optional addition of pentosanase enzyme further reduces and degrades the connective tissue that had been previously attacked by the glycoside hydrolase anzymes. It is believed that the by-product of the glycoside hydrolase degradation will be degraded by the action of the pentosanase enzyme to effect a quicker and more effective breakdown of the connective tissue. Tests have demonstrated that the use of the pentosanase enzyme permits lower dwell times for the marine creatures in the enzyme bath. An added benefit of such a shorter time is that there is a minimal adverse effect upon the desirable edible tissue by the other enzymes in the bath when the pentosanase enzymes are incorporated into the bath.

The pentosanase enzyme causes a reaction upon the 5 carbon carbohydrate as well as complexes and multiples thereof. Any pentosanase enzyme may be used as disclosed in "Enzymes" and may include, for examples only, kinases, ketolisomerases, epimerases, etc. Specifically, the pentosanase enzyme may be for example — fructokinose. Pentosanase may be also referred to as gum hydrolysis or gumase. The amount of the pentosanase enzyme that is to be present should vary between 1 and 50 percent of the total weight of the enzymes present.

Optionally, either or both (a) any pectolytic enzymes such as pectinase/pectinesterase/pectin methyl esterase or others may be disclosed in "Enzymes" are suitable and may include also polygalacturonase, etc., and (b) any cellulolytic enzymes as may be disclosed in "Enzymes" are suitable and may include carboxymethylcellulase, beta-1, 4-glucan 4-glucano hydrolose, etc., may also be added to the above enzymes with or without the pentosanase optional addition. The amount of pectolytic enzymes that may be used may vary from 1 to 20 percent of the total weight of enzymes present in the aqueous bath. The amount of the cellulolytic enzymes that may be used may vary between 1 and 10 percent by weight of the total enzymes.

The aqueous bath into which the marine creatures are to be immersed should have a concentration of the enzymes in the combination as previously described of 0.003–3 percent by weight. The temperature and the time at which the marine creatures should be immersed in the aqueous bath of enzymes may vary considerably and need only be sufficient to dissolve at least partially the connective tissue that exists between the undesirable edible tissue and the desirable edible flesh so that the undesirable edible tissue will be easily removed by simply rinsing or water spraying the marine creature so treated. More precisely, however, the more effective time for immersion has been found generally to vary between about 30 seconds to about 2 hours. The preferable time usually is 1 to 5 minutes for marine creatures that have been shelled; for fish the preferable times are 10–90 minutes. The temperature of the enzyme bath may vary greatly but preferably is from 75° to 175° F, desirably 110° to 140° F, and most desirably 115° to 130° F.

The temperature of the enzyme bath while not critical, is desirably for efficiency and economy, though not necessarily, maintained at a relatively even temperature in order to achieve greater activity and longer life from the enzymes. For instance, a maximum 1–20 percent variation in bath temperature would be usually desirable and a variation of a maximum of 3 percent is most preferable. To this end, it is an optional feature of the present invention to preheat the marine creatures when needed to the approximate temperature of the enzyme bath in order not to chill the bath temperature by the immersion of marine creatures beyond the desirable 20 percent variation for the bath temperature. Frequently the marine creatures have been chilled in order to retard bacteria growth and at such a low temperature, immersion in an enzyme bath will drop the temperature of the bath.

The pH of the enzyme solution is not critical, but may vary from 3.5 to 12.0. If a particular pH is desired, although none has been found to be critical, the enzyme solution may be buffered by the addition of organic acid such as citric, malic, tartaric, lactic, or other organic acids or inorganic acids such as phosphoric, sulfuric, hydrochloric, or others, or may be made more alkaline by the addition of such alkalies as the hydroxides of calcium, sodium, potassium, or other alkaline metal or alkaline earth metals, or salts of these acids such as sodium citrate or potassium phosphate. The amount of the buffering agents is not critical, and would be determined easily by one skilled in the art.

In use with various shellfish, such as abalones, conches, mussels, scallops, oysters, clams, and the like, to remove the undesirable edible tissue from the desirable edible flesh after the shells have been removed by either the processes outlined in my prior application, previously mentioned, or done manually or mechanically, the marine creature so freed from the shell is ready to be immersed in the enzyme bath.

With respect to clams only, it has been further found that it is preferable, though not essential to divide the clams as by chopping, slicing or cutting into smaller portions. The final size is not important but with the larger clams, several divisions are desirable. Commercially, clams in strips of about one-half inch are often used and desired in industrial applications.

The dividing of the clam effectively permits a greater weight of clams to be packed into the same volume. For instance, clams passed through a ¾ inch commercial chopping plate fill a 3-gallon can with 28 pounds of clams, while the undivided 4-5-inch diameter clams fill the same can with 23 to 24 pounds of clams.

It should be understood, however, that while the slicing of the clam flesh will facilitate the removal of the undesirable edible portions, whole clam flesh may be similarly processed. If the clam were to be immersed in the enzyme solution whole, without being divided, additional time would be required though generally only several additional minutes.

The following examples are illustrative only. In all of these examples the enzymes may be more specifically identified as follows: proteolytic:ATP:protein phospho transferase; lipolytic:glycerol ester hydrolyase; glycoside hydrolase:alpha-1, 4-glucan 4-glucanohydrolase; pentosanase: fructokinose; pectolytic:polygalacturonase and cellulolytic: beta-1, 4-glucan 4-glucano-hydrolase.

EXAMPLE 1

Clams were shucked in a high temperature oven and washed in a conventional circular washer under sprays of water. Twenty-five pounds of whole washed clams were sliced into ½ inch strips in a conventional clam slicer. Sliced clams were placed in a perforated stainless steel tub. The tub of clams were immersed immediately in an aqueous enzyme solution containing 0.026 percent enzyme mixture. The volume of solution was 6 gallons. The enzyme solution contained 40 percent proteolytic enzyme, 25 percent glycoside hydrolase enzyme and 35 percent lipolytic enzyme. Temperature of solution was 125° F. The temperature of solution was maintained by circulating water at 125° F through the jacket of the stainless steel kettle in which the enzyme solution was contained. Agitation of the solution around and through the tub containing the clams was maintained by bubbling compressed air through the solution.

Reaction time was 2 ½ minutes. The perforated tub containing the clams was removed from the enzyme solution and sprayed by a jet of water at 40 psi from a hose. All the undesirable edible tissue in the form of belly material immediately disintegrated and washed through the perforations in the tub leaving behind the desirable edible clam flesh. The drained clam flesh was weighed and found to be 21 pounds 1 ounce; this is equivalent of 84.30 percent. By conventional squeezing methods of belly removal, the recovery is approximately 70 to 72 percent.

For comparison, 18 pounds 1 ounce of conventionally squeezed clam flesh was ground in a conventional clam chopper and canned under commercial practice simultaneously with clams prepared by the present invention. The enzyme treated clams were thermally processed in cans along with conventionally handled clams in the same pressure retort. After cooling and removal from retort, the processed clams were examined by "blind" comparison by experts in canned clam evaluation. No difference was noted in color, texture, flavor, aroma and drained weight between enzyme treated and conventionally processed clams. The same "blind" evaluation was conducted on samples of both types of pack after accelerated storage for 10 days at 37° C (98° F). Again no difference was noted between the samples.

EXAMPLE 2

The exact procedure of Example 1 was followed except that the enzyme solution contained 10 percent pentosanase enzyme and 30 percent proteolytic enzyme. The glycoside hydrolase and lipolytic enzyme concentrations remained the same. The immersion time was reduced to 1 minute 45 seconds with even slightly improved product in color and flavor due to having been subjected to the enzyme solution for an even shorter period of time.

EXAMPLE 3

Clam tongues, that portion of the clam in which the belly is contained, were separated from the remainder of the clam flesh manually. The separated tongues with bellies attached were sliced in ⅛-inch strips in a conventional clam slicer. The sliced clams were subjected to an identical treatment as described in Example 1 except that reaction time in the enzyme solution was reduced to 1 minute, 5 seconds, and the enzyme solution contained 35 percent proteolytic, 20 percent glycoside hydrolase, 5 percent pectolytic, 30 percent lipolytic, 5 percent pentosanase, and 5 percent cellulolytic. The washed and drained clam strips were weighed and the recovery was 50.5 percent. Conventional hand squeezing for belly removal recovery is 32–37 percent.

The drained strips were chilled for 2 days, battered and breaded in conventional equipment with regular commercial battering and breading materials. The breaded strips were then frozen in a blast freezer in 2-pound cartons. After a 5-day storage, the enzyme treated clam strips and strips from conventional handling were deep-fat fried in identical baskets in the same deep-fat fryer at 375° F. "Blind" evaluations for flavor, color, aroma, and texture were conducted by experts and laymen. No difference could be determined between enzyme treated and conventionally handled clam strips.

EXAMPLE 4

"Calico" scallops were shucked in a mechanical shucker. Ten pounds of scallops complete with viscera were washed with water, drained, and placed in a perforated stainless steel tub. The tub of scallops was immediately immersed in an aqueous enzyme solution containing 0.026 percent enzyme mixture and comprising 40 percent of the proteolytic enzyme, 25 percent of the glycoside hydrolase enzyme, and 35 percent of the lipolytic enzyme. Five gallons of the enzyme solution was used. Temperature of the solution was maintained at 125° F by circulating water at 125° F through the jacket of the Kettle containing the enzyme solution. Agitation of the solution around and through the scallops was achieved by bubbling compressed air through the solution. The scallops were exposed to the enzyme solution for five minutes, removed to a revolving rod reel washer with rods spaced three-eights inch apart. The scallops were washed with sprays of water at 50 psi while revolving in the washer. Scallops were washed free of all undesirable edible tissue, including the viscera, the digestive system, straps (gills) and reproductive system. The clean adductor muscle — the desirable edible flesh portion of the creature — was completely free of previously attached undesirable tissue. Four pounds and 15 ounces of cleaned adductor muscle were recovered from the original ten pounds of original material (49.3 percent). Quality of the enzyme treated scallops was adjudged by experts in the field and found to be identical to hand shucked and hand cleaned scallops.

With respect to the application of the present process to clams, it has been discovered as a desirable modification to the present invention to wash the clams prior to preheating and immersion into the enzyme solution.

The washing of the clams is preferably after it has been divided and the inner tissue exposed to the washing medium. Water is the preferable medium and may be sprayed, poured or otherwise applied to the divided clams or they may be immersed into a bath of water for a short time. The water temperature is not critical but generally may be below 150° F. Tap water temperature is entirely adequate. Time is not important in this preferred washing step and may only be sufficient, depending upon the means of applying the water, to wash the exposed tissue faces.

It is believed that this washing step effects the removal of a substantial portion of the naturally occurring enzymes in exposed cut cells and open interstices of the clam. Such enzymes may adversely affect the composition of the subsequent enzyme bath. Surprisingly, these naturally occurring enzymes present in the marine creature will tend to detract from the color, texture and taste of the clam, particularly if the divided clam is preheated to meet the temperature of the enzyme bath. While the effect of these naturally occurring enzymes is minimized by omitting the preheating bath, the advantages of preheating combined with the benefits of prior washing the divided clams, produces a product from the enzyme bath that removes the undesirable edible tissue while retaining the greatest amount of desirable edible tissue having the best color, taste and texture. It can be demonstrated, for instance, that the yield of the desirable edible tissue is increased compared to the process without the use of the washing of the divided clams.

The reasons behind this discovery are that clams being a product of their environment in the water, vary widely in composition and as is well known, taste, etc. Of particular concern is that type, activity and the composition of the naturally occurring enzymes is not constant when obtained from beds in different areas. The present discovery is that by washing as much of the variable naturally occurring enzyme from the clam, particularly when divided, a more uniform and effective subsequent treatment may be obtained from an enzyme bath of known and continuous desirable concentration. A uniform product and higher yield have resulted.

It should be understood that this unique washing step is separate from the initial washing of the shucked clam which is designed to remove foreign matter and does not affect the internal enzyme concentration.

The following example illustrates the application of this concept of the present invention.

EXAMPLE 5

One hundred pounds of heat shucked whole clams were chopped in a commercial food chopper with ¾ inch plate. Chopped clams were washed in a perforated bottomed washer with screw conveyor to move the flesh through the water into a tumble perforated reel with water sprays at tap water temperature of 60° F. Water from perforated tumble reel was caught in a pan beneath the reel and pumped back to first washer to conserve water. Clams passed from reel to a perforated draining pan and then to 3-gallon lacquered cans. Closed cans were refrigerated in a cold room under cracked ice to a center can temperature of 35° F which required 6 hours. Twenty-five pounds of the above refrigerated chopped clams with bellies in, were placed in a perforated stainless steel tub. Tub was immersed immediately in a water bath containing 75 gallons of water at 128° F. Tub was raised and lowered in the warm water for 3 minutes. Tub of clams was removed from warm water and immediately immersed in an aqueous solution containing 0.026 percent enzyme mixture, total volume being 6 gallons. Enzyme solution contained 20 percent proteolytic, 25 percent glycoside hydrolase and 50 percent lipolytic and 5 percent pentosanase. Temperature of the solution was 125° F. Solution temperature was maintained by circulating water at 125° F through the jacket of the stainless steel kettle in which the enzyme solution was contained. Solution was agitated around and through the clams by bubbling compressed air through the solution. Reaction time was 2 minutes at which time the clams were removed from the solution and sprayed by a jet of water at 40 psi from a hose. All of the undesirable edible tissue in the form of belly material immediately disintegrated and washed through the perforations leaving behind the desirable edible clam flesh. The drained clam flesh weighed 21 pounds, 6 ounces, equivalent to 85.5 percent recovery. Color of the clam flesh was identical to fresh clams conventionally treated.

EXAMPLE 6

Six hundred pounds of heat shucked clams with bellies in were chopped in a commercial food chopper with ¾ inch plate. The chopped clams were washed in a perforated bottom washer with a screw conveyor to move the flesh through the water into a perforated tumble reel with water sprays at 62° F to remove the naturally occurring enzymes. Washed clams deposited onto a perforated draining pan and then still with belly in, were placed in 3-gallon cans (lacquered) and held overnight under refrigeration in cracked ice. The following day the clams were treated as follows: Approximately 25 pounds of clams were placed in a perforated stainless steel tub which was placed in a water bath of 75 gallons at 128° F. The tub was gently rocked to assure intimate mixing of the clams with the warm water. After 3 minutes the tub of clams was removed from the bath with temperature of the clams 125° F. The tub of clams was immersed immediately into 50 gallons of 0.026 percent aqueous enzyme solution. The enzyme mixture was composed of 20 percent proteolytic, 25 percent glycoside hydrolase and 55 percent lipolytic. Temperature of the enzyme solution was maintained at 125° F by circulating water at 125° F through the jacket of the stainless steel kettle in which the enzyme solution was contained. The solution was agitated around and through the tub of clams by bubbling compressed air through the solution. Reaction time was 2 ½ minutes. The tub of clams was removed from the enzyme solution and sprayed with a jet of water at 40 psi from a hose. All of the undesirable edible tissue in the form of belly material immediately disintegrated and washed through the perforations of the tub leaving behind the desirable clam flesh. The drained clam flesh was emptied into a plastic bag contained in a 30-gallon steel drum. This procedure was repeated 24 times until 600 pounds of the divided washed clams with bellies in had been preheated in the same 75 gallons of warm water and treated in the same 50 gallons of enzyme solution. Total weight of the drained clams was 507 pounds for a recovery of 84.5 percent. Quality of clams treated from all of the batches was identical. Color was bright and typical of conventionally prepared fresh clams. Texture and flavor of the clam flesh were also the same as conventionally prepared fresh clams. The enzyme solution was drained into plastic lined drums. While still warm 110°–125° F, it was fed by gravity into a ZIL type horizontal continuous decanting centrifuge operating at 5,500 rpm at a rate of 803 gallons per hour. Enzyme solution before centrifuging contained 8 percent sediment (by volume) and 450 milligrams of sand per gallon. The centrifuged enzyme solution contained 1.0 percent sediment and 3.0 milligrams of sand per gallon. This example indicates that enzymes retain their activity potential in the same manner as other catalysts without "wearing out" or depletion through re-usage if maintained at a uniform temperature. The example also shows if the enzyme solution is clarified continuously, it can be used in a process system designed for continuous flow of clams.

It should be clearly understood that within the broadest aspects of the present invention, it is not necessary to maintain the enzyme bath at a relatively constant composition or temperature nor is it essential to divide the clams or other marine creatures and subsequently wash and preheat them to the enzyme bath temperature. However, it has been discovered that beyond the unique results of the present invention in simply using an enzyme bath within a stated range of enzyme composition as in Example 1, that even further improvements in quality and quantity of the product, longer life of the enzyme bath and shorter operational time may be achieved by washing the divided clams, and preheating to the temperature of the enzyme bath. As previously stated, the addition of the optional pentosanase enzyme further improves the degradation of the connective tissue. The source of the enzymes for inclusion in the enzyme bath is not important.

To demonstrate the applicability of the present process for the removal of skin from fish, the following Examples are illustrative:

EXAMPLE 7

Ten whole skipjack tuna, previously steamed to backbone temperature of 140° F in steam cabinets, cooled to room temperature, were used in this demonstration. The fish weighed from 6 to 10 pounds each.

Solution:

| | |
|---|---|
| Mixture of enzymes | 40 grams |
| Water | 35 gallons |

The enzyme mixture comprised 50 percent proteolytic, 5 percent glycoside hydrolase, 2 percent pectolytic, 35 percent lipolytic, 3 percent pentosanase, and 5 percent cellulolytic.

Five fish selected at random were placed in a stainless steel wire basket suspended in a stainless steel jacketed kettle in which the enzyme solution was maintained at 120° F by circulating water at 120° F through the jacket of the kettle. The solution was agitated by bubbling compressed air through the solution surrounding the fish. Tuna were immersed in the enzyme solution for a period of 10 minutes.

Five fish selected at random were treated in exactly the same manner as described above except that the water contained no enzymes; these fish were used for controls.

To compare the ease of skin removal, the enzyme treated fish were placed individually in wire baskets and subjected to sprays of water from a hose with a nozzle providing water pressure of about 40 psi. Approximately 85 percent of the skin was readily removed from the tuna by water spray with very slight attendant flesh loss accompanying the skin removal.

The control fish, however, resisted efforts of skin removal by water spray except with extremely vigorous spraying which caused a heavy flesh loss and was considered by tuna canning experts as being entirely prohibitive. It is believed that the fish skin is rendered more readily removable due, at least in part, to the softening of the fatty connective tissue between the skin and the flesh.

EXAMPLE 8

Frozen skipjack tuna were heated in conventional steam cabinets on racks to an interior temperature at backbone of 140° F. Twelve tuna were cooled on racks to room temperature. Six tuna were placed on a stainless steel mesh rack and immersed in an aqueous solution containing 0.026 percent enzyme mixture buffered to a pH of 6.00 with monopotassium phosphate. The enzyme mixture contained 58 percent proteolytic, 5 percent glycoside hydrolase, 2 percent pectolytic, 35 percent lipolytic. Temperature of the solution was maintained at 125° F in the jacketed kettle containing the solution and fish by circulating water at 125° F through the jacket of the kettle. The tuna remained in the solution for 35 minutes, the solution continuously agitated by blowing compressed air through it. Tuna were removed and sprayed with water at 40 psi on all sides to remove the undesirable edible skin from the desirable edible flesh. Skin removal was judged to be 80 to 90 percent effective without removing any edible flesh from the tuna.

The remaining six tuna were immersed in a water bath under conditions identical to those described herein but without addition of the enzymes. Upon removal from the bath they were subjected to the same type of spray washing with a result of about 10 to 15 percent removal of skin and severe lose of edible tuna flesh.

EXAMPLE 9

Six frozen, eviscerated, whole albacore tuna were selected for this experiment weighing from 30 to 40 pounds each. Three tuna were placed in an aqueous solution containing 0.045 percent enzyme mixture containing 45 percent proteolytic, 10 percent glycoside hydrolase, 42 percent lipolytic, and 3 percent pentosanase. The mixture was maintained at 125° F by circulating water at 135° F through the jacket of the kettle containing the fish and solution. Higher temperature of heating water was necessary to compensate for cooling of the enzyme solution by the frozen fish. Enzyme solution was agitated around the fish by bubbling action of compressed air introduced into the kettle. Tuna were subjected to this treatment for 30 minutes.

Three tuna were treated in an identical manner in a water bath without the enzyme solution, as controls.

The six tuna, appropriately tagged for identification, were placed in a steam cabinet for four hours until backbone temperature of 140° F was reached. The tuna were removed from the cabinet and allowed to cool overnight at room temperature. Skin from all of the tuna was accomplished by hand skinning.

Skin on the enzyme treated fish could be grasped at the tail of the fish and pulled free of edible flesh almost in one whole piece with very little force necessary. No hand scraping with knives was required except where breaks in the skin occurred during catching and freezing operations. These small areas required the normal scraping where steaming had caused dehydration and discoloration of the tuna flesh.

Skin on the control fish was still tightly adhering to edible tuna flesh. Only small patches near the tail and along the back fin of the fish could be removed by pulling with the fingers. In some instances, desirable edible flesh adhered to the skin. Approximately 80 percent of the skin needed vigorous hand scraping with knives to separate skin from edible flesh.

Experienced tuna processors estimated that skin removal from albacore tuna was improved in efficiency by about 75 percent using enzyme treatment over conventional methods. Incidentally, it should be noted here that the albacore tuna is considered by tuna processors to be the most difficult of all large species of fish to skin because of the extreme adherence of the connective tissue between skin and flesh.

From the foregoing Examples, it should be evident that the present invention enables those processors of marine creatures to more rapidly and economically separate the desirable edible flesh from the undesirable edible tissue, and particularly to remove skin from various fish or to remove the digestive, reproductive, or other tissue, from desirable edible flesh that has been previously removed from various shellfish.

I claim:

1. A method for removal of undesirable edible tissue from desirable edible flesh of marine creatures comprising, immersing said creatures in an aqueous bath having a concentration of enzymes of 0.003 to 3 percent, said enzymes being a mixture composed by weight of 1 to 75 percent proteolytic, 1 to 75 percent glycoside hydrolase, 1 to 75 percent lipolytic enzymes, at a temperature and for a time sufficient to dissolve at least partially the connective tissue between said undesirable edible tissue and said desirable edible flesh, and separating said undesirable edible tissue from said desirable edible flesh.

2. The method of claim 1 wherein the undesirable tissue is part of the digestive system of the clam.

3. The method of claim 1 including dividing the marine creature to produce cut surfaces, washing the cut surfaces prior to immersion in said bath.

4. The method of claim 1 wherein the undesirable edible tissue is the exterior skin of a fish.

5. The method of claim 4 wherein the fish is any of catfish, tuna, trout, haddock, cod, and flat fish.

6. The method of claim 1 wherein the time is 30 seconds to 2 hours and the temperature is 75° to 175° F.

7. The method of claim 6 wherein the time is 1 to 5 minutes, and the temperature is 110° to 140° F for previously shelled marine creatures and for fish a 10 to 90 minute time.

8. The method of claim 3 wherein the pH of the aqueous bath is 3.5 to 12.0 and including the step of preheating said marine creature to the approximate temperature of said bath.

9. The method of claim 1 including, 1 to 20 percent pectolytic and 1 to 10 percent cellulolytic enzymes present in said bath.

10. The method of claim 1 including 1–50 percent pentosanase enzyme present in said bath.

11. The method of claim 1 wherein flesh treated with said bath includes the shellfish abalones, conches, mussels, scallops, oysters, and clams.

12. The method of claim 1 for processing clams including, dividing the clam to produce exposed cut surfaces, washing the clams including the cut surfaces of the clams, heating the clams prior to said immersion in said bath.

13. The method of claim 1 wherein the composition of the enzymes by weight is, proteolytic 5 to 75 percent, glycoside hydrolase 5 to 25 percent, lipolytic 5 to 50 percent, and pentosanase 1 to 50 percent.

14. The method of claim 13 wherein the undesirable tissue is the belly of a clam and the time of immersing is 1 to 5 minutes.

15. The method of claim 13 wherein the undesirable tissue is the skin of a fish and the time of immersing is 10 to 90 minutes.

16. The method of claim 13 wherein the undesirable tissue is the viscera of a scallop.

17. The method of claim 1 wherein the marine creature has previously been removed from a shell prior to immersion in said bath and the time is 1 to 5 minutes and the temperature 115° to 130° F.

18. The method of claim 1 wherein the time is 30 seconds to 2 hours and the temperature of the bath is 75° to 175° F and including the steps of dividing the marine creature to produce exposed cut surfaces, washing said cut surfaces to remove at least part of any naturally occurring enzymes and preheating said marine creature prior to immersing said creature in said bath.

19. The method of claim 18 including 1 to 50 percent pentosanase enzyme present in said bath.

20. The method of claim 19 wherein said bath is at a temperature of 110° to 140° F.

21. The method of claim 18 wherein said washing is by water spray.

22. The method of claim 1 including attacking selectively the by products of the attack of the glycoside hydrolase enzymes upon the connective tissue by including 1 to 50 percent pentosanase enzymes in said bath.

23. The method of claim 19 wherein the time is 1 to 5 minutes and the temperature 110° to 140° F.

24. The method of claim wherein the concentration of the bath is by weight, proteolytic 5 to 75 percent, glycoside hydrolase 5 to 25 percent, lipolytic 5 to 50 percent, and pentosanase 1 to 50 percent.

* * * * *